US010423817B2

(12) United States Patent
Lo et al.

(10) Patent No.: US 10,423,817 B2
(45) Date of Patent: Sep. 24, 2019

(54) LATENT FINGERPRINT RIDGE FLOW MAP IMPROVEMENT

(71) Applicant: MorphoTrak, LLC, Anaheim, CA (US)

(72) Inventors: Peter Zhen-Ping Lo, Mission Viejo, CA (US); Hui Chen, Foothill Ranch, CA (US)

(73) Assignee: MorphoTrak, LLC, Anaheim, CA (US)

( * ) Notice: Subject to any disclaimer, the term of this patent is extended or adjusted under 35 U.S.C. 154(b) by 76 days.

(21) Appl. No.: 15/857,267

(22) Filed: Dec. 28, 2017

(65) Prior Publication Data

US 2019/0205589 A1 Jul. 4, 2019

(51) Int. Cl.
*G06K 9/00* (2006.01)

(52) U.S. Cl.
CPC .......... *G06K 9/001* (2013.01); *G06K 9/0008* (2013.01)

(58) Field of Classification Search
CPC . G06K 9/00013; G06K 9/0008; G06K 9/6267
See application file for complete search history.

(56) References Cited

U.S. PATENT DOCUMENTS

| | | | | |
|---|---|---|---|---|
| 2011/0216948 A1* | 9/2011 | Yalla | ................. | G06K 9/00006 382/125 |
| 2011/0262013 A1* | 10/2011 | Rahmes | ............ | G06K 9/00067 382/125 |
| 2014/0226879 A1* | 8/2014 | Westerman | ........ | G06K 9/00013 382/125 |
| 2015/0036896 A1* | 2/2015 | Zhou | .................. | G06K 9/00067 382/124 |
| 2015/0278574 A1* | 10/2015 | Boshra | ................. | G06K 9/0008 382/125 |
| 2016/0132715 A1* | 5/2016 | Feng | ...................... | G06T 5/001 382/125 |

(Continued)

OTHER PUBLICATIONS

Feng et al. "Orientation field estimation for latent fingerprint enhancement," IEEE Transactions on Pattern Analysis and Machine Intelligence, 35(4): 925-40, Apr. 2013.

(Continued)

*Primary Examiner* — Bhavesh M Mehta
*Assistant Examiner* — Ian L Lemieux
(74) *Attorney, Agent, or Firm* — Fish & Richardson P.C.

(57) ABSTRACT

Systems and methods may be used by an automatic fingerprint identification system to estimate ridge flow maps in latent fingerprints. A latent fingerprint image and a plurality of reference ridge flow maps may initially be obtained. A latent ridge flow map for the obtained latent fingerprint image may be computed. One or more characteristics associated with the latent ridge flow map may be compared to one or more characteristics associated with each of the plurality of reference ridge flow maps. A similarity score between the latent ridge flow map and a particular reference ridge flow map may be computed for each of the reference ridge flow maps. The top closely matched ridge flow maps are used to improve the latent ridge flow map to enhance the latent fingerprint image to extract better set of minutia points to improve latent to ten-print matching accuracy.

20 Claims, 13 Drawing Sheets

(56) References Cited

U.S. PATENT DOCUMENTS

| | | | |
|---|---|---|---|
| 2016/0140381 A1* | 5/2016 | Weiner | G06K 9/00087 382/124 |
| 2016/0275330 A1* | 9/2016 | Zhou | G06K 9/0008 |
| 2017/0262691 A1* | 9/2017 | Kuda | G06T 7/00 |
| 2018/0075272 A1* | 3/2018 | Chen | G06K 9/0008 |
| 2019/0122020 A1* | 4/2019 | Chen | G06K 9/0008 |

OTHER PUBLICATIONS

Arora et al. "Latent fingerprint matching: performance gain via feedback from exemplar prints," IEEE Transactions on Pattern Analysis and Machine Intelligence, 36(12): 2452-65, Dec. 2014.

Wang et al. "Enhanced gradient-based algorithm for the estimation of fingerprint orientation fields", Applied Mathematics and Computation, vol. 185, pp. 823-833, year 2007.

Zhou et al. "A model-based method for the computation of fingerprints orientation field", IEEE Tranac. Image Process, vol. 13, pp. 821-835, year 2004.

Karu et al. "Fingerprint classification" Pattern Recognition, vol. 29, No. 3 pp. 389-404, year 1996.

Cappelli et al. "Fingerprint classification by directional Image Partitioning", IEEE Trans. PAMI, vol. 21 No. 5, pp. 402-421, May 1999.

Park et al. "Singular point detection by shape analysis of directional fields in fingerprints", Pattern Recognition, vol. 39, No. 5, pp. 839-855, 2006.

Liu et al. "Fingerprint registration by maximization of mutual information", IEEE Transactions on Image Processing, vol. 15, No. 5, pp. 1100-1110, 2006.

Nilsson et al. "Locaization of Corresponding points in Fingerprints by complex filtering", Pattern Recognition Letters, vol. 24, No. 13, pp. 2135-2144, 2003.

Yager et al. "Coarse Fingerprint Registration Using Orientation Fields," EURASIP Journal on Applied Signal Processing, 2005:13, 2043-2053.

* cited by examiner

LATENT FINGERPRINT RIDGE FLOW MAP IMPROVEMENT

FIELD

This disclosure generally relates to fingerprint identification systems.

BACKGROUND

Pattern matching systems such as ten-print or fingerprint matching systems play an important role in criminal and civil applications. For example, fingerprint identification is often used to identify and track suspects and in criminal investigations. Similarly, fingerprint verification is used in in civil applications to prevent fraud and support other security processes.

SUMMARY

Latent fingerprint images are often captured on different surfaces in various lighting conditions. Latent fingerprint images may be blurred, have noise, and generally have reduced overall image quality. In many instances, such latent fingerprint images are only partial prints having reduced fingerprint regions to be analyzed by an automatic fingerprint identification system (AFIS). Modern AFIS systems often perform poorly when analyzing low quality latent fingerprint images because of distortions, different types of noise backgrounds and/or partial images limiting feature extraction for identification and matching.

AFIS often compares a latent fingerprint image against ten-print images stored within a reference database to identify a potential match within the reference database. Because the quality of latent fingerprint images is usually very poor, it is difficult to correctly mark minutia points and accurately match latent fingerprint images to ten-print images. As a result, the accuracy of latent to ten-print matching is still far below regular fingerprint to fingerprint matching. A reliable and robust ridge flow estimation method is key to the latent fingerprint image matching and enhancement.

Aspects of this disclosure address the above-noted deficiencies and, according to some implementations, include systems and methods for estimating patterns of a latent fingerprint. The method, executed at least in part by one or more processors, includes: obtaining (i) a latent fingerprint image, and (ii) a plurality of reference ridge flow maps that are each associated with a particular fingerprint pattern; determining a latent ridge flow map for the obtained latent fingerprint image; determining a similarity score between the latent ridge flow map and each of the plurality of reference ridge flow maps by comparing one or more characteristics associated with the latent ridge flow map to one or more corresponding characteristics associated with each of the plurality of reference ridge flow maps; determining a likely latent fingerprint pattern of the latent fingerprint image based on the determined similarity scores; selecting a set of the reference ridge flow maps that have a pattern that matches the likely latent finger print pattern and that satisfy a similarity threshold; aggregating the set of reference ridge flow maps that have a pattern that matches the likely latent finger print pattern and that satisfy the similarity threshold; transposing an estimated latent ridge flow map onto the obtained latent fingerprint image, the estimated latent ridge flow map being based on the aggregated set of the reference ridge flow maps; and providing, for output, the obtained latent fingerprint image and the estimated latent ridge flow map transposed on to the obtained latent fingerprint image Implementations may each optionally include one or more of the following features. For instance, in some implementations, the selected set of the reference ridge flow maps include reference ridge flow maps that have similarity scores greater or equal than the similarity threshold.

In some implementations, determining the likely latent fingerprint pattern includes: generating a feature vector that includes features associated with the plurality of reference ridge flow maps; inputting the generated feature vector into a trained classifier; and estimating one or more one or more fingerprint patterns present within the latent fingerprint image based at least on features associated with the plurality of reference ridge flow maps that are identified by the trained classifier.

In some implementations, generating the feature vector includes: aligning the latent ridge flow map with each of the plurality of reference ridge flow maps; comparing each block of the latent ridge flow map and each of the plurality of reference ridge flow maps; determining the similarity scores associated with the comparing of each block of the latent ridge flow map to the plurality of reference maps; and generating the feature vector based on the similarity scores.

In some implementations, aligning the latent ridge flow map with each of the plurality of reference ridge flow maps includes using one or more of a maximization of mutual information technique, a generalized Hough transformation technique, use of core, delta or distinctive pattern-based technique, and a gradient decent method with a cost function technique.

In some implementations, obtaining the plurality of reference ridge flow maps includes: obtaining a plurality of reference fingerprint images that are each associated with a respective fingerprint pattern, wherein one or more of the plurality of reference fingerprint images are associated with a fingerprint pattern different from a fingerprint pattern of another one of the plurality of reference fingerprint images; computing a reference ridge flow map for each of the plurality of reference fingerprint images; selecting a second set of representative reference ridge flow maps for each respective fingerprint pattern; and storing, as the plurality of reference ridge flow maps, (i) the second set of representative ridge flow maps for each respective fingerprint pattern, and (ii) fingerprint patterns respectively corresponding to each representative ridge flow map among the second set of representative ridge flow maps.

In some implementations, the obtained plurality of reference fingerprint images have a quality indicator that satisfies a quality threshold. Each of the plurality of reference fingerprint images includes (i) a ridge contrast satisfying a contrast threshold, (ii) a full fingerprint, and (iii) a plurality of fingerprint patterns. Each of the plurality of reference fingerprint images is manually labelled to include one or more fingerprint patterns.

In some implementations, selecting the second set of representative reference ridge flow maps for each respective fingerprint pattern includes selecting the second set of representative reference ridge flow maps using one or more: (i) a K-means clustering technique, (ii) an agglomerative clustering technique, or (iii) an unsupervised learning technique.

In some implementations, transposing the estimated latent ridge flow map onto the obtained latent fingerprint image includes superimposing an aggregate ridge flow map that is generated by aggregating the set of the reference ridge flow maps and using transformation parameters obtained when comparing the one or more characteristics associated with the latent ridge flow map to the one or more corresponding characteristics associated with each of the plurality of reference ridge flow maps.

In some implementations, the method further includes generating the estimated latent ridge flow map by, for each block of the likely latent fingerprint pattern, determining an estimate of a latent ridge flow block based on an aggregation of corresponding matched blocks of the selected set of reference ridge flow maps.

In some implementations, the estimated latent ridge flow map is determined according to a weighted average of the corresponding matched blocks of the selected set of reference ridge flow maps.

In some implementations, transposing the estimated latent ridge flow map onto the obtained latent fingerprint image includes, for each block of the estimated latent ridge flow map: determining a direction associated with the largest ridge flow in the estimated latent ridge flow block; and assigning a direction to the estimated latent ridge flow block based in part on the determined direction associated with the largest ridge flow.

Other aspects include corresponding methods, systems, apparatus, computer-readable storage media, and computer programs configured to implement the above-noted embodiments.

The above-noted aspects and implementations further described in this specification may offer several advantages. For example, according to the implementations described in this specification, estimated fingerprint patterns can be used to reduce the number of fingerprint images to be searched against within a reference database during a fingerprint identification operation in order to identify match candidates. Estimated fingerprint patterns present within a latent fingerprint image can be used to quickly and efficiently discard reference ten-print images that have different features and/or attributes. Accordingly, the resources necessary to perform a fingerprint matching operation can be reduced since the disqualification of certain ten-print images reduces the computational burden of comparing a latent fingerprint image against all ten-print images within the reference database.

Additionally, according to implementations described in this specification, feature vectors may be utilized to achieve a high degree of accuracy in predicting the fingerprint patterns present within a partial distorted latent fingerprint image. The best matched reference ridge flow maps are used to improve the latent ridge flow map to enhance a latent image and extract a better set of minutia points and improve latent to ten-print matching accuracy.

The details of one or more implementations are set forth in the accompanying drawings and the description below. Other features and advantages will become apparent from the description, the drawings, and the claims.

BRIEF DESCRIPTION OF THE DRAWINGS

In the drawings, like reference numbers represent corresponding parts throughout.

DETAILED DESCRIPTION

In general, implementations described in this disclosure include accurately estimating fingerprint patterns present within a latent fingerprint image. An AFIS may obtain a latent image and a plurality of reference ridge flow maps, and generate a latent ridge flow map for the obtained latent image. The AFIS may then compare the latent ridge flow map with the plurality of reference ridge flow maps (530) and compute a similarity score between the latent ridge flow map and each of the plurality of the reference ridge flow maps. A trained classifier and feature vectors may be used to estimate a likely fingerprint pattern present within the latent fingerprint image. Then, the AFIS may select a set of the reference ridge flow maps having the highest similarity scores and the same pattern as the estimated pattern and transfer the selected reference ridge flow maps to the coordinate system of the latent image. An improved latent ridge flow map may then be output to improve latent feature extraction.

System Architecture

Figure 1A:
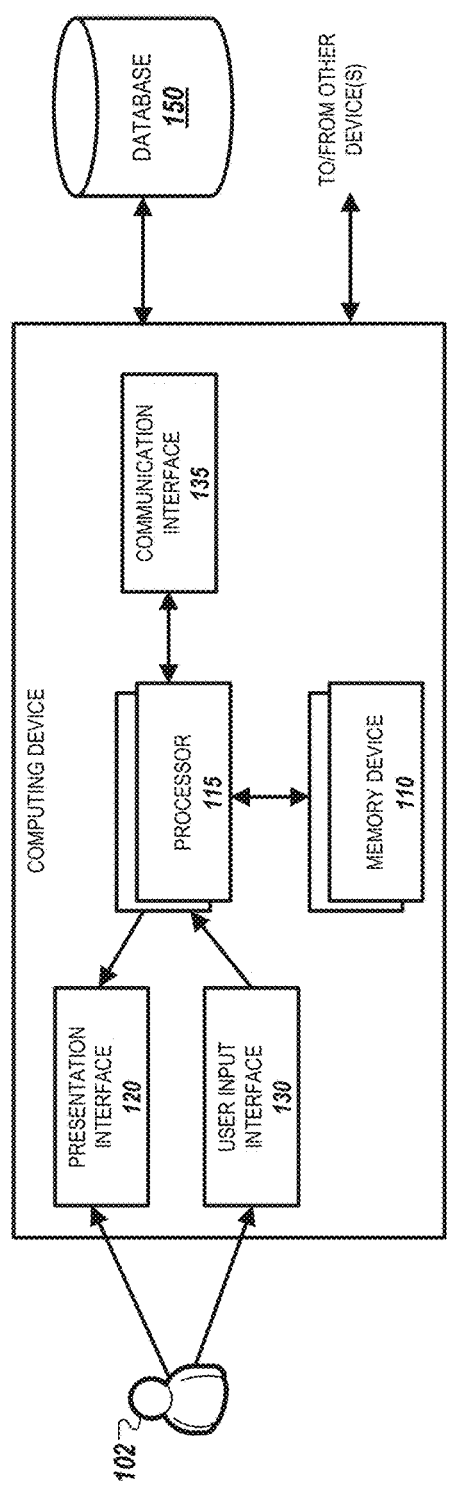
FIG. 1A illustrates a block diagram of an exemplary automatic fingerprint identification system.

FIG. 1A is a block diagram of an exemplary automatic fingerprint identification system (AFIS) 100. Briefly, the AFIS 100 may include a computing device including a memory device 110, a processor 115, a presentation interface 120, a user input interface 130, and a communication interface 135. The AFIS 100 may be configured to facilitate and implement the methods described in this specification. In addition, the AFIS 100 may incorporate any suitable computer architecture that enables operations of the systems described in this specification.

The processor 115 may be operatively coupled to memory device 110 for executing instructions that implement the methods described in this specification. In some implementations, executable instructions are stored in the memory device 110. The AFIS 100 may be configurable to perform one or more operations executable by the processor 115. For example, the processor 115 may be programmed by encoding an operation as one or more executable instructions and providing the executable instructions in the memory device 110. The processor 115 may include one or more processing units, e.g., without limitation, in a multi-core configuration.

The memory device 110 may be one or more devices that enable storage and retrieval of information such as executable instructions and/or other data. The memory device 110 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

The memory device 110 may be configured to store a variety of data including, for example, matching algorithms, scoring algorithms, scoring thresholds, perturbation algorithms, fusion algorithms, virtual minutiae generation algorithms, minutiae overlap analysis algorithms, and/or virtual minutiae analysis algorithms. In addition, the memory device 110 may be configured to store any suitable data to facilitate the methods described throughout this specification.

The presentation interface 120 may be coupled to processor 115. For instance, the presentation interface 120 may present information, such as a user interface showing data related to fingerprint matching, to a user 102. For example, the presentation interface 120 may include a display adapter (not shown) that may be coupled to a display device (not shown), such as a cathode ray tube (CRT), a liquid crystal display (LCD), an organic LED (OLED) display, and/or a hand-held device with a display. In some implementations, the presentation interface 120 includes one or more display devices. In addition, or alternatively, the presentation interface 120 may include an audio output device (not shown), e.g., an audio adapter and/or a speaker.

The user input interface 130 may be coupled to the processor 115 and receives input from the user 102. The user input interface 130 may include, for example, a keyboard, a pointing device, a mouse, a stylus, and/or a touch sensitive panel, e.g., a touch pad or a touch screen. A single component, such as a touch screen, may function as both a display device of the presentation interface 120 and the user input interface 130.

In some implementations, the user input interface 130 may represent a fingerprint scanning device that is used to capture and record fingerprints associated with a subject (e.g., a human individual) from a physical scan of a finger, or alternately, from a scan of a latent print. In addition, the user input interface 130 may be used to create a plurality of reference records.

A communication interface 135 may be coupled to the processor 115 and configured to be coupled in communication with one or more other devices such as, for example, another computing system (not shown), scanners, cameras, and other devices that may be used to provide biometric information such as fingerprints to the AFIS 100. Such biometric systems and devices may be used to scan previously captured fingerprints or other image data or to capture live fingerprints from subjects. The communication interface 135 may include, for example, a wired network adapter, a wireless network adapter, a mobile telecommunications adapter, a serial communication adapter, and/or a parallel communication adapter. The communication interface 135 may receive data from and/or transmit data to one or more remote devices. The communication interface 135 may be also be web-enabled for remote communications, for example, with a remote desktop computer (not shown).

The presentation interface 120 and/or the communication interface 135 may both be capable of providing information suitable for use with the methods described throughout this specification, e.g., to the user 102 or to another device. In this regard, the presentation interface 120 and the communication interface 135 may be used to as output devices. In other instances, the user input interface 130 and the communication interface 135 may be capable of receiving information suitable for use with the methods described throughout this specification, and may be used as input devices.

The processor 115 and/or the memory device 110 may also be operatively coupled to the database 150. The database 150 may be any computer-operated hardware suitable for storing and/or retrieving data, such as, for example, pre-processed fingerprints, processed fingerprints, normalized fingerprints, extracted features, extracted and processed feature vectors, threshold values, virtual minutiae lists, minutiae lists, matching algorithms, scoring algorithms, scoring thresholds, perturbation algorithms, fusion algorithms, virtual minutiae generation algorithms, minutiae overlap analysis algorithms, and virtual minutiae analysis algorithms.

In some implementations, the database 150 may be integrated into the AFIS 100. For example, the AFIS 100 may include one or more hard disk drives that represent the database 150. In addition, for example, the database 150 may include multiple storage units such as hard disks and/or solid state disks in a redundant array of inexpensive disks (RAID) configuration. In some instances, the database 150 may include a storage area network (SAN), a network attached storage (NAS) system, and/or cloud-based storage. Alternatively, the database 150 may be external to the AFIS 100 and may be accessed by a storage interface (not shown). For instance, the database 150 may be used to store various versions of reference records including associated minutiae, octant feature vectors (OFVs) and associated data related to reference records.

Fingerprint Identification and Matching

In general, the AFIS 100 may perform fingerprint identification and matching in two stages: (1) an enrollment stage, and (2) an identification/verification stage.

In the enrollment stage, an individual (or a "registrant") has their fingerprints and personal information enrolled. The registrant may be an individual manually providing their fingerprints for scanning or, alternately, an individual whose fingerprints were obtained by other means. In some examples, fingerprints may be enrolled using latent prints, libraries of fingerprints, and any other suitable repositories and sources of fingerprints. As described, the process of "enrolling" and other related terms refer to providing biometric information (e.g., fingerprints) to an identification system (e.g., the AFIS 100).

AFIS 100 may extract fingerprint patterns from fingerprints. As described herein, "patterns" and related terms refer to characteristic attributes of features that are classified during a fingerprint identification or matching operation. Examples of patterns include whorls, left loops, right loops, arches, and ridge flow patterns. The patterns present within a fingerprint are then used for to classify a latent fingerprint.

In some implementations, the enrollment stage may be used to obtain a plurality of fingerprints as references to generate a fingerprint reference database. As a result, by enrolling a plurality of registrants (and their associated fingerprints and personal information), the AFIS 100 may create and store a library of reference records that may be used for comparison to search records. The library may be stored at the database 150.

In the identification stage, the AFIS 100 may use features extracted from a fingerprint and personal information to generate a record known as a "search record". The search record represents a source fingerprint for which identification is sought. For example, in criminal investigations, a search record may be retrieved from a latent print at a crime scene. The automatic fingerprint identification may compare the search record with the enrolled reference records in the database 150. For example, during a search procedure, a search record may be compared against the reference records stored in the database 150. In such an example, the features of the search record may be compared to the features of each of the plurality of reference records. For instance, minutiae extracted from the search record may be compared to minutiae extracted from each of the plurality of reference records.

A similarity score may refer to a degree or numerical value representation of the similarity of fingerprint features (e.g., minutiae) between the search record and each reference record. For instance, in some implementations, the values of the similarity score may range from 0.0 to 1.0, where a higher magnitude represents a greater degree of similarity between the search record and the reference record.

The AFIS 100 may compute individual similarity scores for each comparison of features (e.g., minutiae), and aggregate similarity scores (or "final similarity scores") between the search record to each of the plurality of reference records. In this regard, the AFIS 100 may generate similarity scores of varying levels of specificity throughout the matching process of the search record and the plurality of reference records.

The AFIS 100 may also sort each of the individual similarity scores based on the value of the respective similarity scores of individual features. For instance, the automatic identification system 100 may compute individual similarity scores between respective minutiae between the search fingerprint and the reference fingerprint, and sort the individual similarity scores by their respective values. A higher final similarity score indicates a greater overall similarity between the search record and a reference record while a lower final similarity score indicates a lesser over similarity between the search record and a reference record.

Pattern Extraction

Figure 1B:
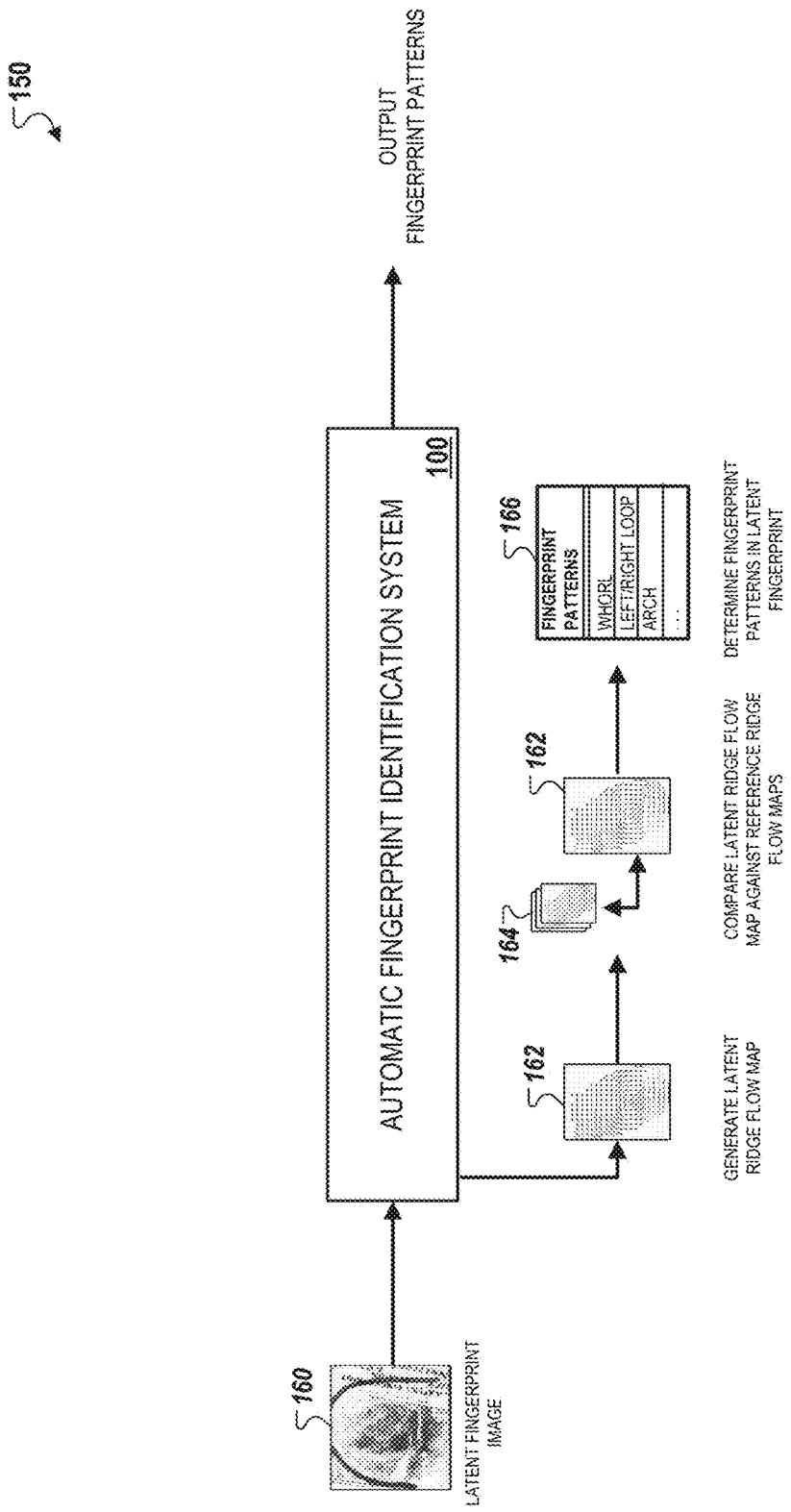
FIG. 1B illustrates a block diagram of an exemplary fingerprint pattern extraction process.

FIG. 1B is a block diagram of an exemplary fingerprint pattern extraction process 150 performed by the AFIS 100. As depicted, the process 150 generally includes five stages: (i) obtaining a latent fingerprint image 160, (ii) generating a latent ridge flow map 162 for the obtained latent fingerprint image 160, (iii) comparing the latent ridge flow map 162 against a set of reference ridge flow maps 164, (iv) estimating a set of fingerprint patterns 166 in the latent fingerprint image 160, and (v) outputting the estimated set of fingerprint patterns 166.

The AFIS 100 may initially generate a set of reference ridge flow maps 164 prior to performing the process 150. The set of reference ridge flow maps 164 may be pre-generated ridged flow maps for a set of selected high quality images that are predetermined to have each type of the fingerprint patterns. Further descriptions related to generation of the set of reference ridge flow maps 164 are provided with the description of FIG. 2.

During the fingerprint pattern extraction process, the AFIS 100 may initially obtain one or more latent fingerprint images 160 from various suitable sources, such as a criminal information database, a biometric database, or member database. The AFIS 100 may generate a latent ridge flow map 162 for an obtained latent fingerprint image. The latent ridge flow map 162 provides a directional arrangement of friction ridges present within the latent fingerprint image 160. For instance, the latent ridge flow map 162 includes an arrangement of ridge flow vectors that are tangential to the direction of the friction ridges of the latent fingerprint.

The latent ridge flow map 162 may be generated using a variety of techniques. For instance, in some implementations, the latent ridge flow map 162 is generated using automated tools to extract the flow directions from the latent fingerprint image 160. In such implementations, the automated markup may be post-processed using a set of image processing techniques to correct inaccuracies in the automated flow map. In other implementations, the latent ridge flow map 162 is estimated using a combination of automated and manual techniques. In such implementations, a latent examiner may manually correct inaccuracies in the automated flow map.

The AFIS 100 then compares attributes associated with the latent ridge flow map 162 with the attributes associated with the set of reference ridge flow maps 164. For instance, the AFIS 100 may measure a correspondence between the latent ridge flow map 162 and each reference ridge flow map from among the set of reference ridge flow maps 164. Such correspondence measurement techniques may include local comparisons of individual ridge flow vectors within particular regions of the latent ridge flow map 162, or global comparisons of sets of ridge flow vectors over the entire area of the latent ridge flow map 162.

The AFIS 100 then computes a set of respective similarity scores that reflect a degree of similarity between the latent ridge flow map 162 and each of the set of reference ridge flow maps 164. The AFS 100 uses the computed similarity scores between the latent ridge flow map 162 and each of the set of reference ridge flow maps 164 to filter and select a subset of the set of reference ridge flow maps 164 that are determined to be the most similar to the latent ridge flow map 162. For instance, the AFS 100 may use a threshold similarity score and select only those reference ridge flow maps that have a computed similarity score greater than the threshold similarity score.

The patterns associated with each of the selected subset of the set of reference ridge flow maps 164 are then analyzed and processed to predict a set of fingerprint patterns associated with the latent ridge flow map 162. In some implementations, as described herein with respect to FIGS. 4-5, this is accomplished with the generation of a feature vector for the selected subset of the set of reference ridge flow maps 164, and use of a trained classifier to predict one or more fingerprint pattern classes of the latent fingerprint image 160 based on the generated feature vector.

For example, in some implementations, manually verified classifications associated with each of the subset of the set of reference flow maps 164 may be identified, and the most probable class labels are assigned to the latent fingerprint image 160 based on the classifications associated with particular reference flow maps that are determined to be most similar to the latent ridge flow map 162. More particular descriptions related to each fingerprint pattern estimation technique for the latent fingerprint image 160 are provided below.

After performing the operations described above, the AFIS 100 may output fingerprint patterns that correspond to a subset of reference flow maps that have the highest similarity scores. The AFIS 100 may select N reference flow maps to be output, where N is any number greater than or equal to 1 and less than the number of total reference ridge flow maps.

Reference Ridge Flow Map Generation

The AFIS 100 may generate a set of reference ridge flow maps 164 before performing a fingerprint pattern estimation operation, as depicted in FIG. 1B, for a latent fingerprint image. As described herein, each individual reference ridge flow map is generated for a predetermined high quality fingerprint image that is manually associated with a particular fingerprint classification (e.g., arch, left loop, right loop, and whorl). In this regard, the number of individual ridge flow maps within the set of reference ridge flow maps 164 is set such that each of the four fingerprint classifications are equally represented within the set, and for each type of fingerprint classification, there are a sufficient number of individual ridge flow maps to cover all fingerprint patterns present within a fingerprint image. Generation of the set of reference ridge flow maps 164 is described below with respect to FIG. 2.

Figure 2:
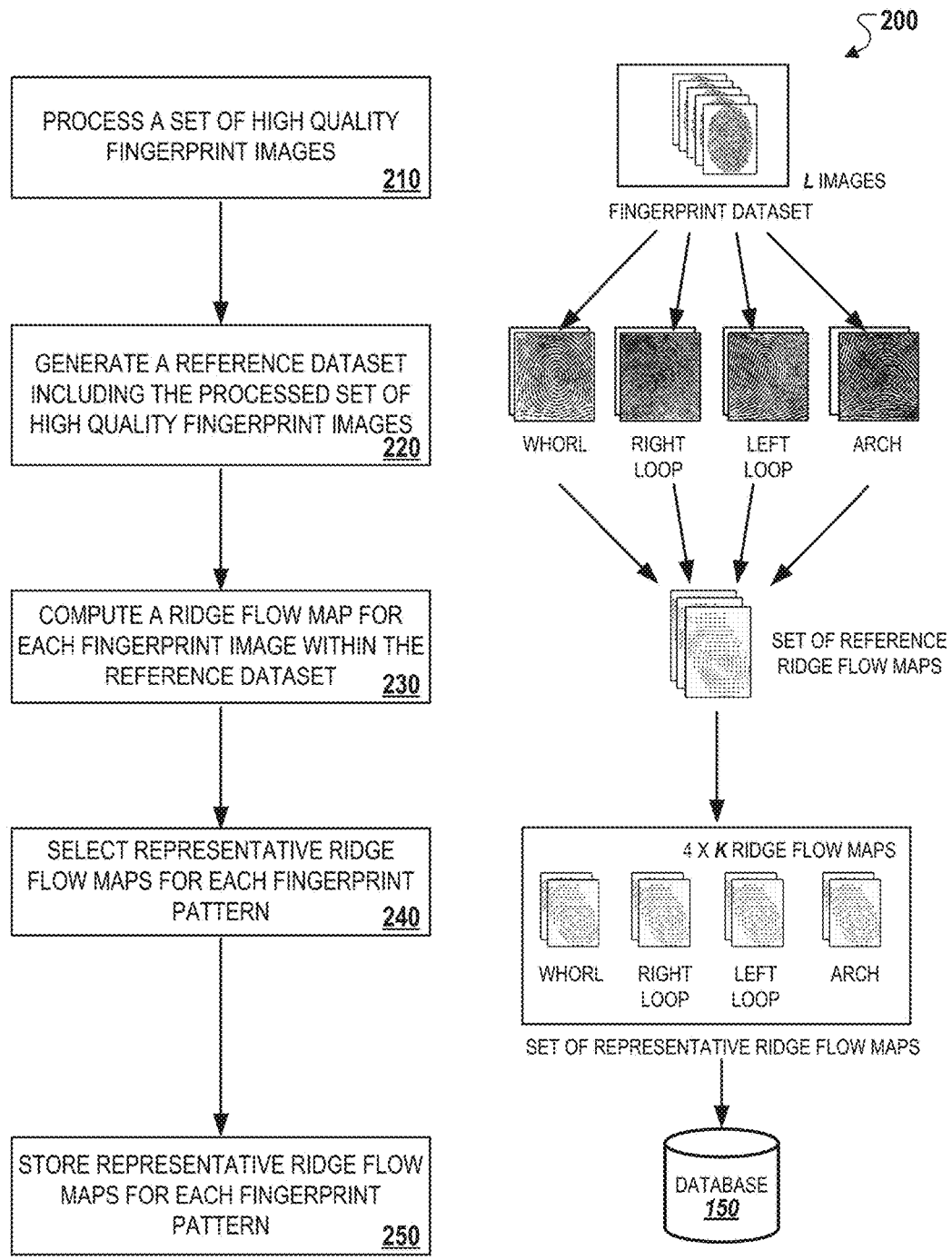
FIG. 2 illustrates an exemplary process for generating and storing a set of representative ridge flow maps for a set of high quality fingerprint images.

FIG. 2 illustrates an exemplary process 200 for generating and storing a set of representative ridge flow maps for a set of high quality fingerprint images. Briefly, the process 200 may include processing a set of high quality fingerprint images (210), generating a reference dataset including the processed set of high quality fingerprint images (220), computing a ridge flow map for each fingerprint image within the reference dataset (230), selecting a set of representative ridge flow maps for each fingerprint pattern (240), and storing representative ridge flow maps for each fingerprint pattern (250).

In more detail, the process 200 may include processing a set of high quality fingerprint images (210). For instance, the AFIS 100 may obtain a set of fingerprint images that have a predetermined set of associated attributes indicating that they are high quality images. Examples of such attributes include having a high ridge contrast, including a full fingerprint (as opposed to a partial fingerprint), and including all possible fingerprint patterns (e.g., whorl, left loop, right loop, arch) within a single image. These images are selected as reference images because processing and analyzing these images to determine the fingerprint patterns included within the images can be performed by the AFIS 100 with a degree of high accuracy (e.g., sufficiently low false positive and/or false negative fingerprint pattern detection).

In some implementations, the AFIS 100 includes a software sub-component that performs a set accuracy tests in order to determine whether a particular fingerprint image should be included within the fingerprint data set including the set of high quality fingerprint images. In such implementations, the sub-component may compute a ridge contrast, determine the number of fingerprint patterns represented within a particular input fingerprint image, determine the type of fingerprint pattern, and/or determine whether the input fingerprint image includes an entire fingerprint. The sub-component may then compare the determined attributes to a set of predetermined criteria in order to automatically determine whether the input fingerprint image should be labeled as a high quality image to be included within the dataset for processing by the AFIS 100.

The process 200 may include generating a reference dataset including the processed set of high quality fingerprint images (220). For instance, the AFIS 100 may select a set of fingerprint images that have attributes indicating that they are high quality images (e.g., ridge contrast, representing a high portion of an entire fingerprint, large number of fingerprint pattern inclusions). The AFIS 100 may then generate a reference dataset that includes these images to be used in a subsequent fingerprint identification.

The AFIS 100 may also perform a set of verification operations to ensure that the generated reference dataset includes an adequate number of different individual fingerprint images. For instances, the verification operations may include determining that each of the different types of fingerprint patterns are equally represented within the reference dataset, and that the individual fingerprint images for each fingerprint pattern contains enough variant images to cover the entire pattern space associated with each fingerprint pattern.

In some implementations, each fingerprint image may be manually labeled by a fingerprint examiner. For example, the fingerprint examiner may manually identify and label the fingerprint patterns that are present within each individual fingerprint image. The manual labels may then be incorporated into the reference dataset for use by the AFIS 100 during a fingerprint identification operation. In some implementations, each fingerprint image may be automatically pre-processed by a pattern classification engine, followed by a manual verification by a latent fingerprint examiner.

The process 200 may include computing a ridge flow map for each fingerprint image within the reference dataset (230). For instance, as described herein with respect to FIG. 1B, the AFIS 100 may compute a ridge flow map for each individual fingerprint image within the reference dataset.

The process 200 may include selecting representative ridge flow maps for each fingerprint pattern (240). After generating ridge flow maps for each of the individual fingerprint images within the reference dataset, the AFIS 100 then uses one or more techniques to select representative ridge flow maps for each fingerprint pattern. For example, in some implementations, the AFIS 100 uses a K-means clustering technique to identify particular ridge flow maps that are the most representative ridge flow maps for a particular fingerprint patter. In some implementations, the AFIS 100 may use techniques such as agglomerative clustering or unsupervised learning.

In some implementations, the number of representative ridge flow maps selected by the AFIS 100 may be adjusted based on, for example, the variations between the individual ridge flow maps for each fingerprint pattern, the number of individual ridge flow maps for each fingerprint pattern, and/or accuracy requirements for a particular fingerprint identification operation. In such implementations, the AFIS 100 may either increase or decrease the number of representative ridge flow maps to include within the stored reference dataset.

The process 200 may include storing a number of representative ridge flow maps for each fingerprint pattern (250). After selecting the representative ridge flow maps for each fingerprint pattern, the AFIS 100 may then store the selected representative ridge flow maps as the set of reference ridge flow maps 164 in the database 150 and corresponding respective fingerprint patterns for each representative ridge flow map among the selected representative ridge flow maps.

Classifier Training

As described herein, in some implementations, the AFIS 100 may use trained classifiers to predict a set of fingerprint patterns present within the latent fingerprint image 160 based on comparisons to a set of reference ridge flow maps that include representative ridge flow maps for each type of fingerprint pattern. The descriptions below provide an overview of the techniques used by the AFIS 100 to train these classifiers.

In general, the classifier used by the AFIS 100 may be a type of statistical classifier that predicts a set of categories (e.g., fingerprint patterns) that the latent fingerprint 160 belongs to on the basis of a training set of data containing observations or instances whose category memberships are known. Examples of specific types of classifiers that are capable of being used by the AFIS 100 include a Random Forest classifier, a support vector classifier, a neural network, a traditional pattern classifier, or any other type of decision-based logic that identifies categories based on analyzing attributes associated with an input given known attributes of the training set of data.

The training dataset used to train the classifier may include a large set of synthetic partial latent images that correspond to a randomly selected partial area from a set of full print images if the number of real latent images are small. The training dataset may include images with different qualities in order to ensure that training enables the classifier to identify patterns present within low quality latent fingerprint images. For instance, the training dataset may include individual fingerprint images with introduced noise to imitate low quality latent fingerprints that are collected in real-world circumstances.

The descriptions below provide an overview of exemplary techniques to train a classifier used to predict fingerprint patterns present within the latent fingerprint image 160. In some implementations, the training procedure may be executed by a software module that is separate component from the AFIS 100 (e.g., an external training system). In other implementations, as described below for simplicity, the training procedure may instead be executed by a software component and/or module that is associated with the AFIS 100.

Figure 3:
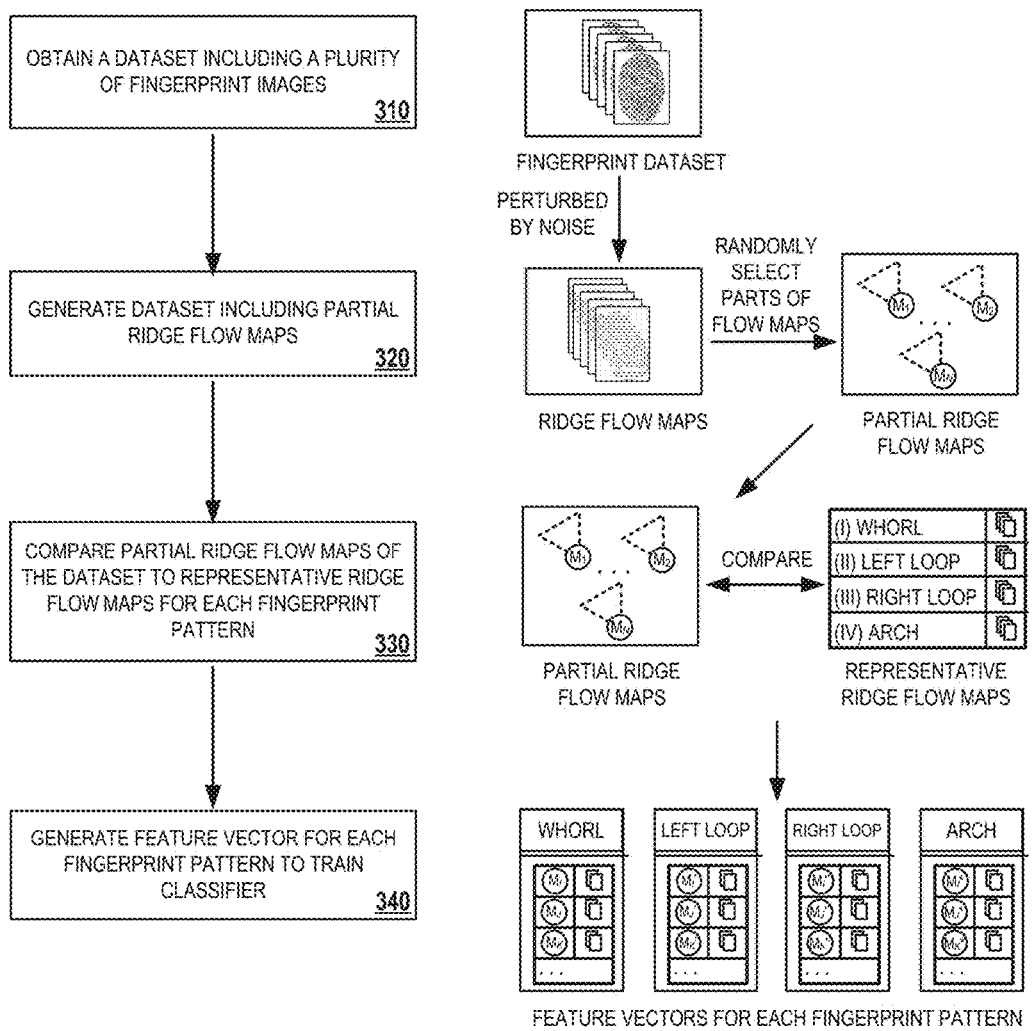
FIG. 3 illustrates an exemplary process for generating feature vectors to train a classifier.

FIG. 3 illustrates an exemplary process 300 for generating feature vectors to train a classifier. In general, the process 300 may include obtaining a dataset including a plurality of fingerprint images (310), generating a dataset including partial ridge flow maps (320), comparing partial ridge flow maps of the dataset to representative ridge flow maps for each fingerprint pattern (330), and generating feature vectors for each fingerprint pattern to train classifier (340).

In more detail, the process 300 may include obtaining a dataset including a plurality of fingerprint images (310). For instance, the AFIS 100 may select a type of classifier and a large dataset that includes various fingerprint images of different qualities. As described herein with respect to FIGS. 1B and 2, the number of individual fingerprint images within the dataset and/or the different quality of fingerprint images may be adjusted to improve the training operation.

The process 300 may include generating a dataset including partial ridge flow maps (320). After obtaining the dataset, the AFIS 100 may introduce synthetic noise into the individual images to imitate particular types of noise perturbations that are frequently present within collected latent fingerprint images. For example, the AFIS 100 may incorporate noise that emulates smudges in fingerprint patterns on a collection surface, distortions related to fingerprint collection on an irregular or curved surface, among other types. After introducing noise into the individual fingerprint images, the AFIS 100 then generates ridge flow maps for each individual fingerprint image using techniques described previously with respect to FIGS. 1B and 2. The AFIS 100 also labels each of the ridge flow maps with an associated fingerprint pattern based on the known pattern associated with the corresponding fingerprint image prior to introducing the noise.

After generating the ridge flow maps for the synthetically distorted fingerprint images, the AFIS 100 then randomly selects a particular ridge flow map to compare against a set of representative reference ridge flow maps for each fingerprint pattern. The selected partial ridge flow map is anticipated to be similar to that of a ridge flow map for a partial latent fingerprint image. However, because the fingerprint patterns associated with the synthetically distorted fingerprint patterns are known when the partial ridge flow maps are selected, the AFIS 100 is able to associate a set of known fingerprint patterns with each of the selected partial ridge flow maps.

The process 300 may include comparing partial ridge flow maps of the dataset to representative ridge flow maps for each fingerprint pattern (330). As described previously with respect to FIG. 2, during the reference ridge flow map generation process, the AFIS 100 selects a set of representative ridge flow maps for each fingerprint pattern from among a set of ridge flow maps for a set of high-quality fingerprint images. The AFIS 100 then aligns the partial ridge flow map and the reference ridge flow map using methods such as maximization of mutual information, a generalized Hough transformation, identification of core, delta, or distinctive patterns, or use of gradient decent with cost function.

After performing the alignment, the AFIS 100 compares the selected partial ridge flow map against each of the representative ridge flow maps for each fingerprint pattern. As described previously with respect to FIG. 1B, the AFIS 100 computes respective similarity scores between the selected partial ridge flow map and each of the set of representative ridge flow maps that reflect a correspondence between two individual ridge flow maps.

The process 300 may include generating feature vectors for each fingerprint pattern to train classifier (340). For instance, the AFIS 100 may iteratively perform steps 320 and 330 for each of the partial ridge flow maps within the dataset. After completing the iterative comparison process, the AFIS 100 identifies, for each partial ridge flow map, a number of representative ridge flow maps for each fingerprint pattern that are determined to be most similar to the selected partial ridge flow maps. Thus, because the partial ridge flow maps are randomly selected from among the generated dataset in step 330, the iterative comparison steps performed in steps 340 and 350 allows the AFIS 100 to determine the particular reference ridge flow maps that are most similar to randomly selected partial ridge flow maps for each type of fingerprint pattern.

The AFIS 100 then generates a feature vector for each fingerprint pattern type. Each feature vector specifies, (i) a particular fingerprint pattern or a plurality of fingerprint patterns, (ii) one or more ridge flow maps, and (iii) for each ridge flow map, a set of representative ridge flow maps for the particular fingerprint pattern. In this regard, the feature vectors provide mappings between attributes associated with distortions among latent fingerprints (e.g., the partial ridge flow maps), and attributes associated with a set of high quality fingerprint images. As described more particularly with respect to FIG. 5, these generated feature vectors enable the AFIS 100 to achieve a high degree of accuracy in predicting the fingerprint patterns present within a partial distorted latent fingerprint image.

Automatic Fingerprint Exclusion Processing

The techniques described above enable the AFIS 100 to automatically and accurately classify types of fingerprint patterns (e.g., whorl, left loop, right loop, arch) that are included within a low quality distorted latent fingerprint image (including partial fingerprint images). Such techniques are advantageous because the predicted fingerprint patterns can then be used to reduce the number of fingerprint images to be searched against within a reference database during a fingerprint identification operation in order to identify match candidates. For example, the estimated fingerprint patterns for the latent fingerprint image 160 can be used as an initial filter to exclude those fingerprint images within the reference database that do not include the predicted fingerprint patterns, and compare the latent fingerprint image 160 only against fingerprint images within the reference database that also have at least one of the estimated fingerprint patterns. This automatic fingerprint exclusion processing technique may use a set of respective pattern labels associated with each identified fingerprint pattern to exclude particular reference fingerprint images that do not include predicted fingerprint images within the latent fingerprint image 160.

Figure 4:
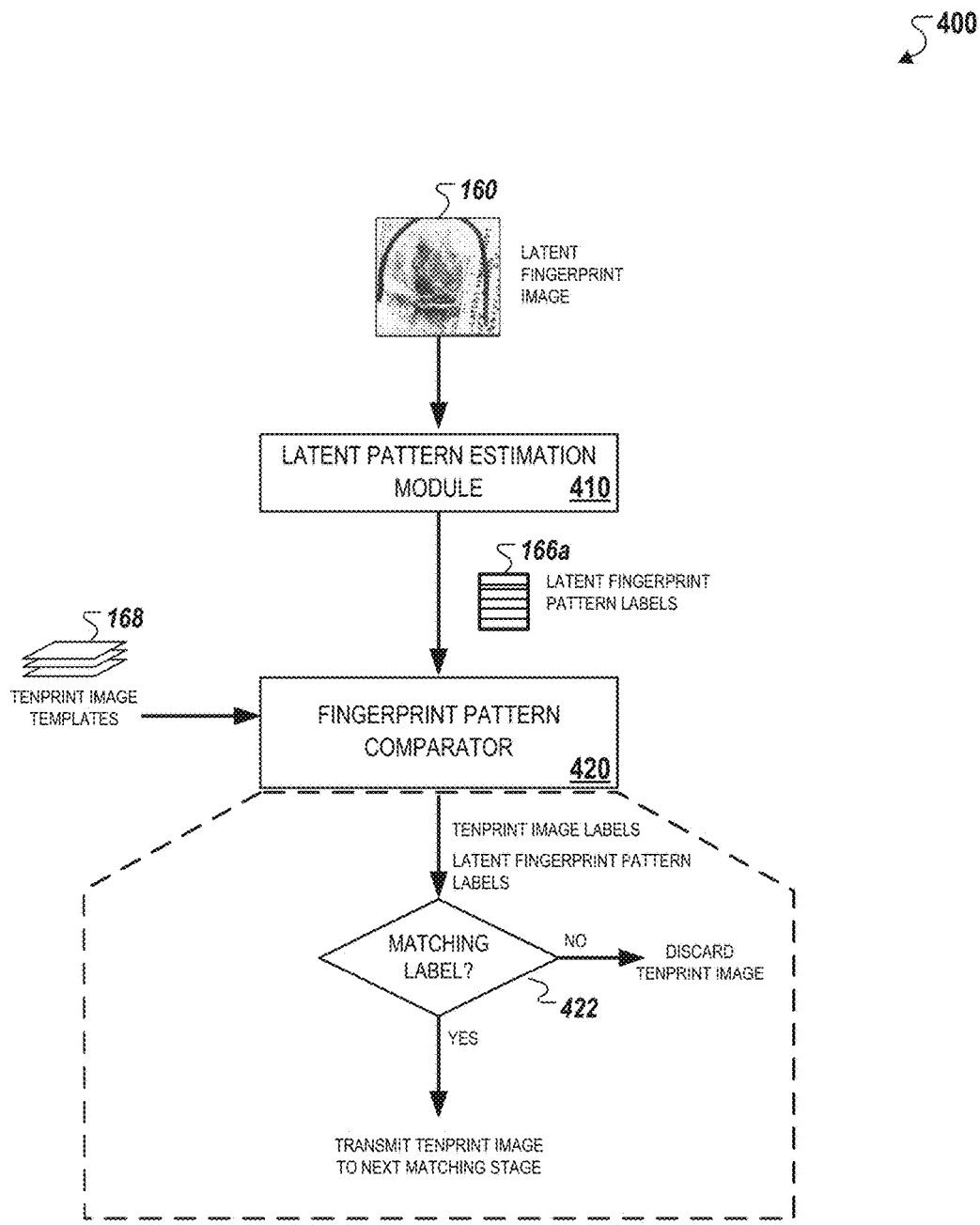
FIG. 4 illustrates an exemplary process for comparing pattern labels between a latent fingerprint image and a set of ten-print image templates.

FIG. 4 illustrates a conceptual diagram for an exemplary system 400 that is capable of using a set of pattern labels to reduce the number of fingerprints to be compared against a latent fingerprint image during a fingerprint identification operation. The system 400 generally includes a pattern simulation module 410 that generates a set of latent fingerprint pattern labels 166 for a latent fingerprint image 160, and a fingerprint pattern comparator 420 that matches the labels 166 against a set of ten-print image templates 168. In some implementations, the system 400 may be a component of the AFIS 100 as described herein with respect to FIG. 1.

In more detail, the latent pattern estimation module 410 may generate a set of labels 166*a* for an input latent fingerprint image 160. For instance, the latent pattern estimation module 410 performs the process 150, as described herein with respect to FIG. 1B, by generating the latent ridge flow map 162 for the latent fingerprint image, comparing the latent ridge flow map 162 against the set of reference ridge flow maps 164, and identifying a list of predicted fingerprint patterns 166 within the latent fingerprint image 160. Each of the predicted fingerprint patterns 166 is then assigned to a particular pattern label 166*a*, which operates as a pattern identifier used to search against a reference database.

The fingerprint pattern comparator 420 receives the pattern labels 166*a* estimated by the latent pattern estimation module 410, and also obtains a set of ten-print image templates 168 from a reference database (e.g., the database 150). The set of ten-print image templates 168 may be generated for a set of ten-print fingerprint images stored at a reference database. The set of ten-print image templates may include features extracted from each ten-print image (e.g., minutiae, geometric parameters, alignment parameters, etc.) as well as a set of ten-print image labels that identify the fingerprint patterns that are included within each ten-print image. For example, if a particular ten-print image includes all four fingerprint patterns, then its corresponding ten-print image template includes four ten-print image labels corresponding to the four identified fingerprint patterns.

The fingerprint pattern comparator 420 then compares the received pattern labels 166*a* of the latent fingerprint image 160 against the ten-print image labels specified by each of the ten-print image templates 168. At step 422, the fingerprint pattern comparator 420 determines if there is at least one matching label between the pattern labels 166*a* and the ten-print image labels included within each ten-print image template 168.

If the fingerprint pattern comparator 420 is unable identify a match for a particular ten-print image template, then the fingerprint pattern comparator 420 determines that the corresponding ten-print image is unlikely to be a match to the latent fingerprint image 160. The fingerprint pattern comparator 420 thus discards the ten-print image from consideration to a subsequent precision matching phase.

If the fingerprint pattern comparator 420 is able to identify a match of the particular ten-print image template, then the fingerprint pattern comparator 420 determines that there may be a likelihood that the corresponding ten-print image may be a match for the latent fingerprint image 160. In this instance, the corresponding ten-print image is instead transmitted to a subsequent matching phase.

In summary, the process 400 illustrates how estimated fingerprint pattern labels of the latent fingerprint image 160 can be used as a first-stage filter within a matching operation to reduce the number of candidate ten-print images to compare against the latent fingerprint image 160. In this regard, because the presence of fingerprint patterns present within a fingerprint image are rough indicators of distinctive features that are eventually used during a fingerprint matching operation, the estimated fingerprint patterns present within the latent fingerprint image 160 can be used to quickly and efficiently discard reference ten-print images that have dramatically different features and/or attributes. This can be used to potentially reduce the amount of resources necessary to perform a fingerprint matching operation since the disqualification of certain ten-print images reduces the computational burden of comparing the latent fingerprint image 160 against all ten-print images within the reference database in subsequent matching procedures.

Figure 5:
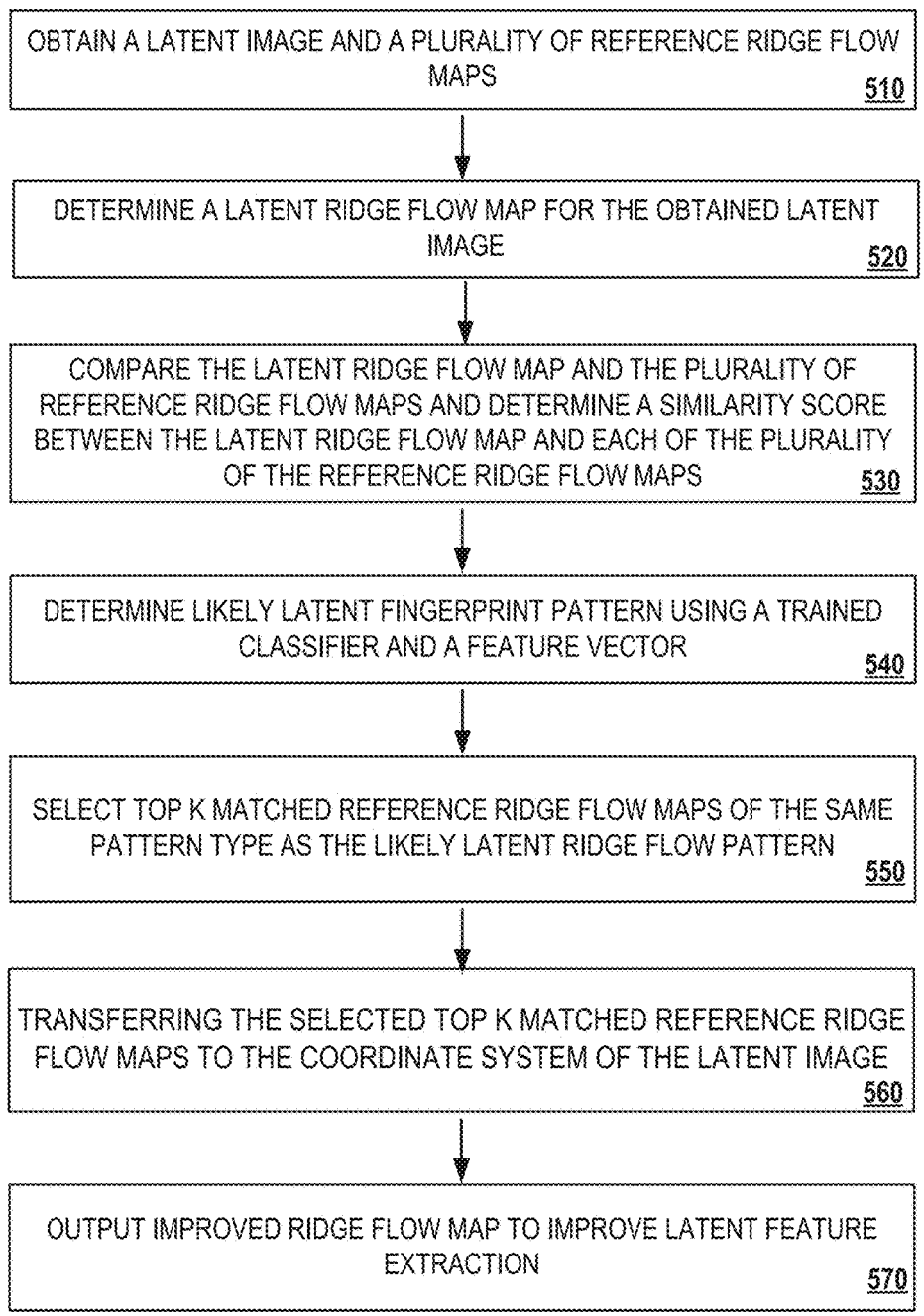
FIG. 5 illustrates an exemplary process for computing fingerprint patterns associated with a latent fingerprint.

FIG. 5 illustrates an exemplary process 500 for computing fingerprint patterns associated with a latent fingerprint. Generally, the process 500 may include obtaining a latent image and a plurality of reference ridge flow maps (510), determining a latent ridge flow map for the obtained latent image (520), comparing the latent ridge flow map and the plurality of reference ridge flow maps (530) and determining a similarity score between the latent ridge flow map and each of the plurality of the reference ridge flow maps, determining a likely latent fingerprint pattern (540), selecting a select number K of the top matching reference ridge flow maps (550), transferring the selected matching reference ridge flow maps to the coordinate system of the latent image (560), and outputting an improved ridge flow map to improve latent feature extraction (570).

In more detail, the process 500 may include obtaining a latent image and a plurality of reference ridge flow maps (510). For instance, as described with reference to FIGS. 1B and 2, the AFIS 100 may obtain the latent fingerprint 160 and a set of reference ridge flow templates 164 that are each associated with a particular fingerprint pattern (e.g., whorl, left loop, right loop, arch).

The process 500 may include determining a latent ridge flow map for the obtained latent image (520). For instance, the AFIS 100 may compute the latent ridge flow map 162 for the obtained latent fingerprint image 160. As described above with respect to FIG. 1B, the latent ridge flow map 162 may be generated using a variety of tools and techniques such as automated flow direction extraction tools, image processing techniques, and/or manual inputs by latent examiners. The latent ridge flow map 162 may provide a directional arrangement of friction ridges present within the latent fingerprint image 160. For instance, the latent ridge flow map 162 may include an arrangement of ridge flow vectors that are tangential to the direction of the friction ridges of the latent fingerprint.

The process 500 may include comparing the latent ridge flow map and the plurality of reference ridge flow maps (530). For instance, the AFIS 100 may compare one or more characteristics associated with the latent right flow map 162 to one or more corresponding characteristics associated with each of the plurality of reference ridge flow maps 164. To do this, the AFIS 100 may align the latent ridge flow map and the reference ridge flow maps using methods such as maximization of mutual information, a generalized Hough transformation, identification of core, delta, or distinctive patterns, or use of gradient decent with cost function. After alignment, the AFIS 100 may compare the selected latent ridge flow map against each of the representative ridge flow maps for each fingerprint pattern, and may determine respective similarity scores between the latent ridge flow map and each of the set of representative ridge flow maps. The comparison may include, in some cases, local comparisons of individual ridge flow vectors within particular regions of the latent ridge flow map, and, in some cases, global comparisons of sets of ridge flow vectors over the entire area of the latent ridge flow map.

The process 500 may include determining a likely latent fingerprint pattern using a feature vector and a trained classifier (540). A feature vector may be generated in the manner described above with respect to operations 330 and 340. For instance, after performing the comparisons and determining similarity scores, the AFIS 100 may identify, for each latent ridge flow map, a number of representative reference ridge flow maps for each fingerprint pattern that are determined to be most similar to the latent ridge flow maps. The classifier in the AFIS 100 may then generate a feature vector for each fingerprint pattern type. Using the feature vectors and the highest similarity scores between the latent ridge flow map and each of the set of representative reference ridge flow maps, the classifier in the AFIS 100 may predict the likely latent fingerprint pattern in the latent image.

The process 500 may then include selecting a number of matched reference ridge flow maps that have the same pattern as the predicted latent fingerprint pattern (550). The number, K, may be set by an administrator of the AFIS 100, and, in some cases, may correspond to a specific percentage or number of the matched reference ridge flow maps. For example, reference ridge flow maps that have the same pattern as the predicted latent fingerprint pattern and have the top 10 or top 10% similarity scores may be selected. In some implementations, the selected ridge maps may include reference ridge flow maps that have the same pattern as the predicted latent fingerprint pattern and computed similarity scores above a predetermined threshold value.

Next, the process 500 may include transferring the K selected reference ridge flow maps to the coordinate system of the latent image using the transformation parameters obtained during the ridge flow matching in operation 530 (560). For each cell block (e.g., a 16×16 cell), evidence from the selected reference ridge flow maps is accumulated and a direction of the cumulative ridge flows is assigned to the estimated latent ridge flow block. The direction in which most of the cumulative ridge flows are directed in is selected as the assigned direction. In some implementations, evidence from each cell block may be averaged or a weighted average may be applied to the evidence.

By completing operations 510-560, the estimated latent ridge flow map may be superimposed onto the latent fingerprint image for output to re-enhance the latent image and extract latent feature for matching (570). In particular, by utilizing the method depicted in FIG. 5, the best matched reference ridge flow maps are used to improve the latent ridge flow map to enhance the latent image to extract better set of minutia points and improve latent to ten-print matching accuracy.

Figure 7B:
FIGS. 7A-7K depict images that illustrate examples of fingerprint enhancement according to implementations described in this specification.
Figure 7A:
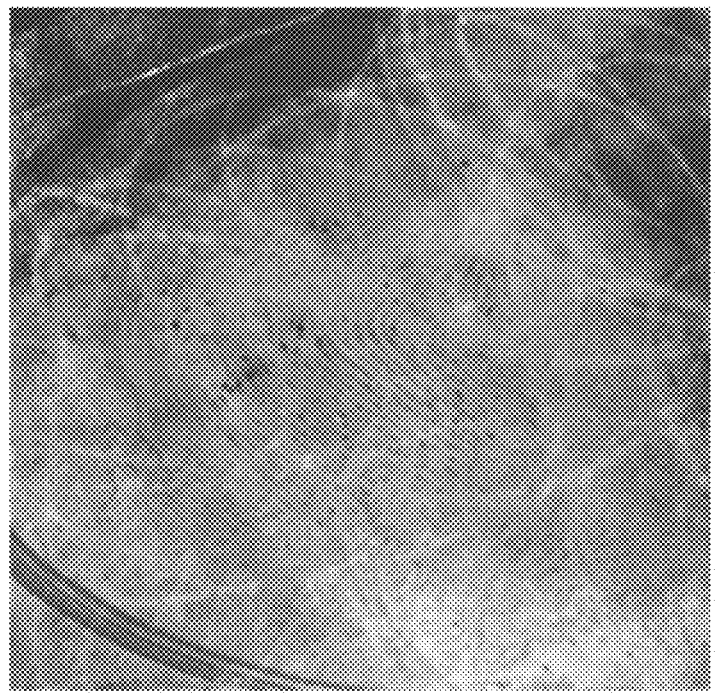

FIGS. 7A-7K and 8A-8K illustrate the enhancements and advantages provided by the methods and systems described in this specification. For example, FIG. 7A depicts an example of latent image obtained from the NIST27 dataset. The latent image in FIG. 7A, as classified by the National Institute of Standards and Technology (NIST), is of poor quality with low contrast and background noise. FIG. 7B is the corresponding mated ten-print image.

Figure 7E:
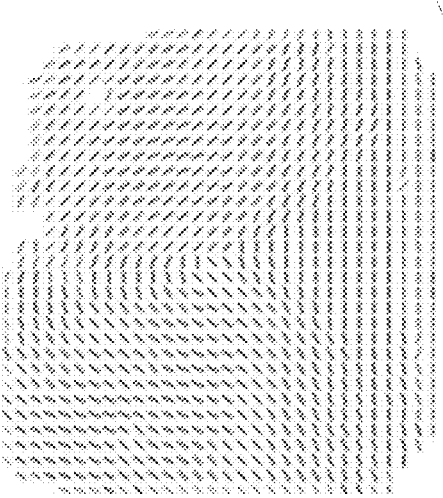
Figure 7G:
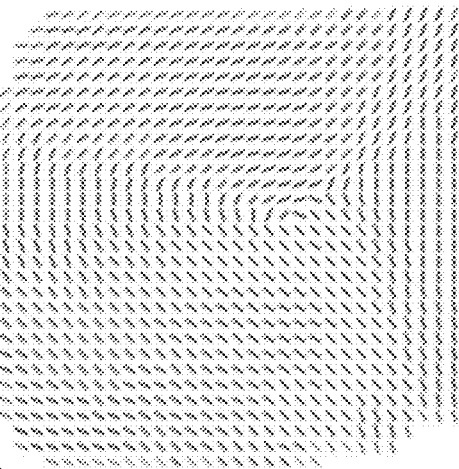
Figure 7D:
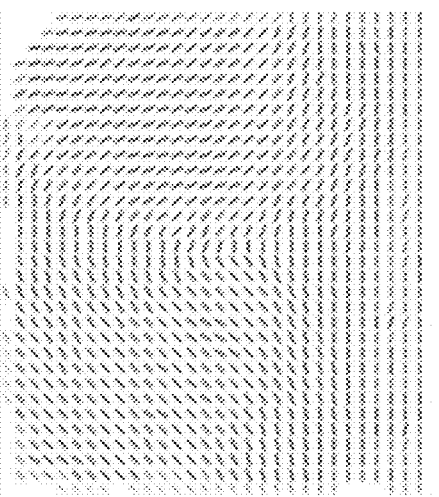
Figure 7F:
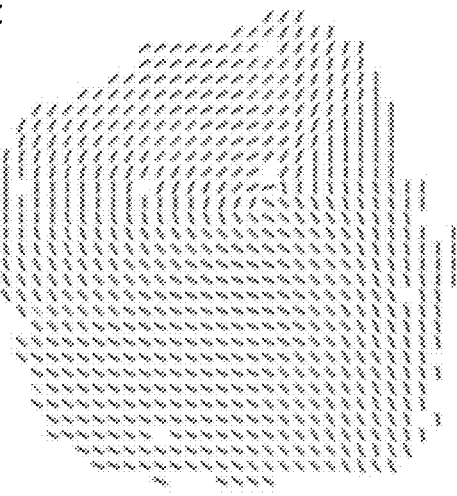
Figure 7C:
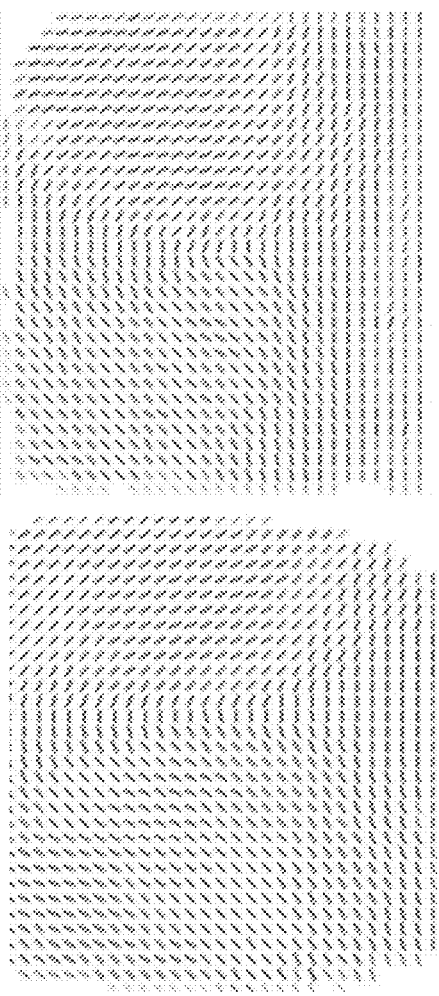

Similar to the process described above with reference to FIG. 5, a latent ridge flow map may be determined from the image shown in FIG. 7A and may be compared to a plurality of reference ridge flow maps to determine one or more reference ridge flow maps that are most similar to the determined latent ridge flow map. FIGS. 7C, 7D, and 7E depict the top three reference ridge flow maps, i.e., having the highest similarity scores to the obtained latent ridge flow map of the image in FIG. 7A.

The three most similar reference ridge flow maps may then be aggregated and a feature vector may be generated based on the similarity scores of the three reference ridge flow maps. In detail, the determined pattern of the latent image may be divided into one or more cells, for example, 16 pixels×16 pixels. For each cell of the latent image pattern, cells in the three reference ridge flow maps that correspond to the cell of the latent image pattern may be identified. The identified cells in the three reference ridge flow maps may be aggregated and the ridge direction having the highest votes after aggregating the corresponding cells may be assigned to the cell of the latent image pattern. The aggregated ridge flow map for all cells, as depicted in FIG. 7F, may then be transferred onto the coordinate system of the obtained latent image using the feature vector, ridge direction, transformation parameters determined when performing ridge flow matching/comparing. FIG. 7G depicts the ridge flow map of the mated ten-print image shown in FIG. 7B. As can be appreciated, the ridge flow map in FIG. 7F is very similar to the ridge flow map of the mated ten-print image of FIG. 7G, thereby illustrating the effectiveness and accuracy of the implementations described in this disclosure.

Figure 7I:
Figure 7K:
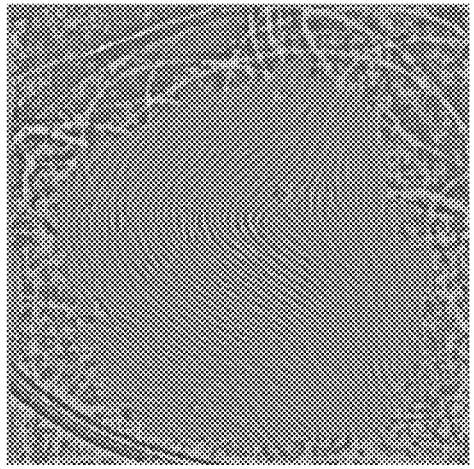
Figure 7H:
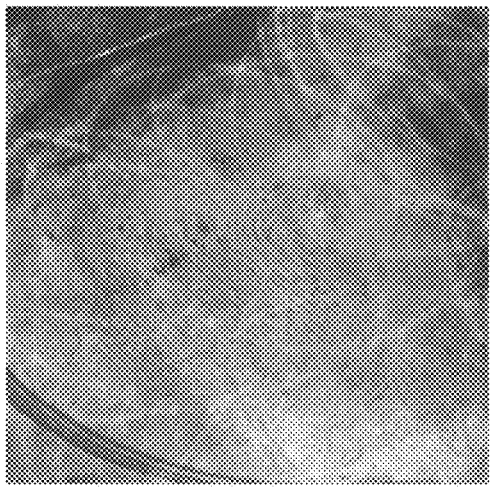
Figure 7J:
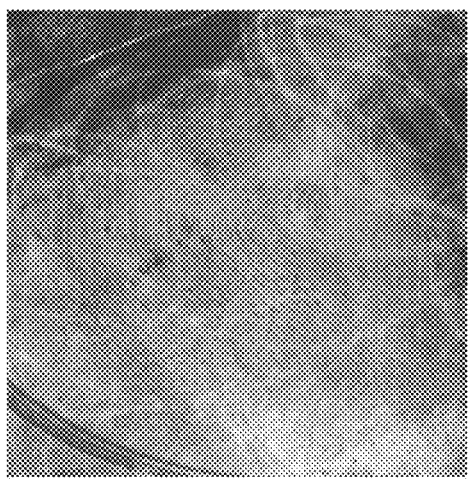

FIG. 7H depicts the ridge flow map extracted according to prior methods and superimposed on the latent image of FIG. 7A. As can be appreciated, the output according to prior methods fails to extract ridge flow for a large portion of the image. FIG. 7I depicts the ridge flow map of the mated ten-print image of FIG. 7B. For comparison purposes, FIG. 7J depicts the estimated ridge flow map that is determined according to the implementations described in this disclosure and superimposed onto the obtained latent image. FIG. 7K shows an enhanced image using the short time Fourier Transform with the estimated ridge flow map. As shown in FIGS. 7J and 7K, the core/delta area of the fingerprint was successfully recovered. A significant improvement and completed mapping area may be observed relative to the ridge flow map of FIG. 7H. Not only can the implementations described herein predict a likely finger print pattern of a latent image, but the most likely ridge map of a latent fingerprint can also be estimated. Thus, a more detailed analysis of a latent fingerprint may be available and better matches to latent fingerprint images may be determined in any subsequent forensic analysis by virtue of having a likely ridge map of the latent fingerprint.

Figure 8B:
FIGS. 8A-8K depict images that illustrate examples of fingerprint enhancement according to implementations described in this specification.
Figure 8A:
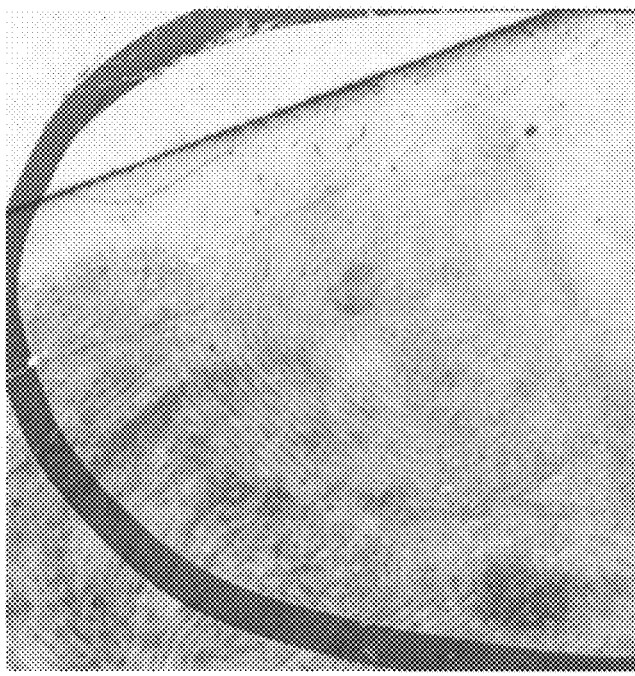
Figure 8C:
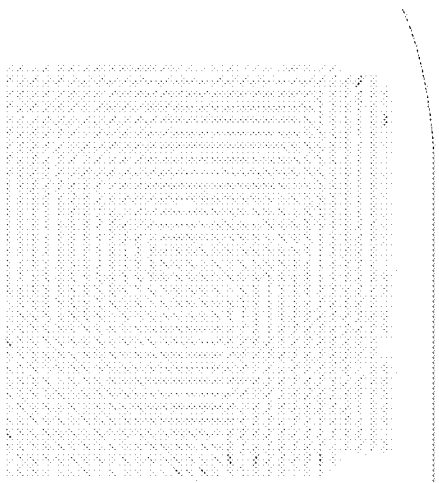
Figure 8D:
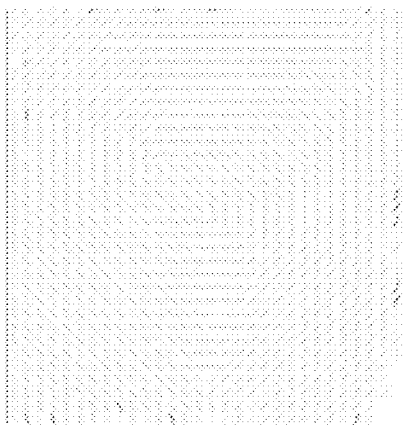
Figure 8E:
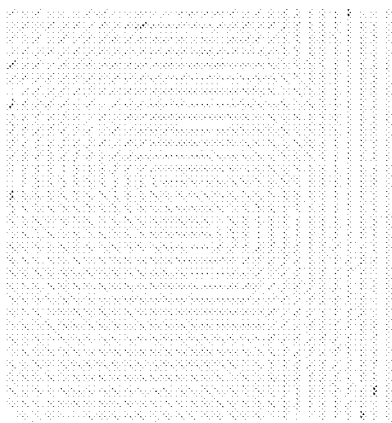
Figure 8G:
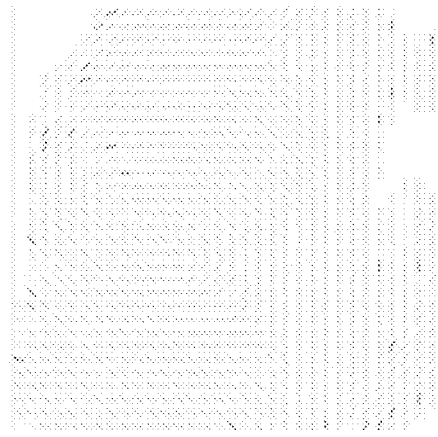
Figure 8F:

FIGS. 8A-8K illustrate another example of the enhancements and advantages provided by the methods and systems described in this specification. For example, FIG. 8A depicts an example of latent image obtained from the NIST27 dataset. The latent image in FIG. 8A is classified as "Ugly" by NIST and has barely visible features with low contrast. FIG. 8B is the corresponding mated ten-print image. FIGS. 8C, 8D, and 8E depict the top three reference ridge flow maps obtained by matching initial ridge flow map of latent image shown in FIG. 8A to the reference ridge flow maps. FIG. 8F depicts the estimated ridge flow map of the latent image, and FIG. 8G depicts the ridge flow map of the mated ten-print image shown in FIG. 8B.

Figure 8I:
Figure 8K:
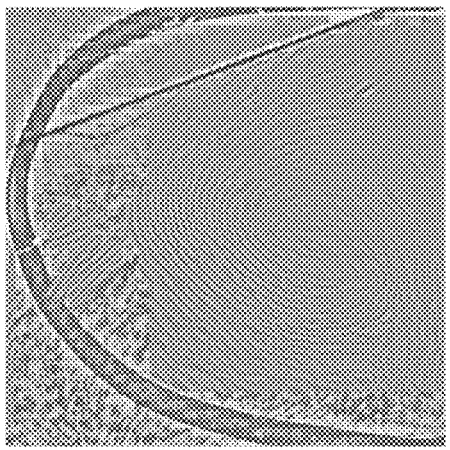
Figure 8H:
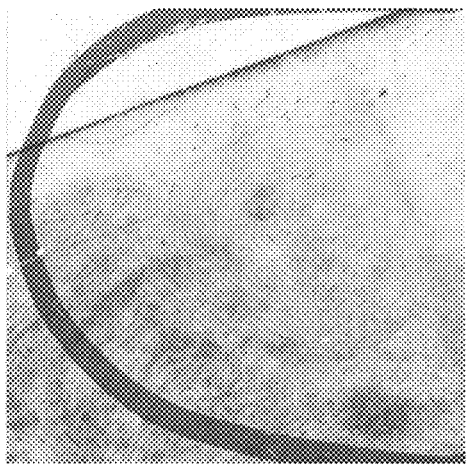
Figure 8J:
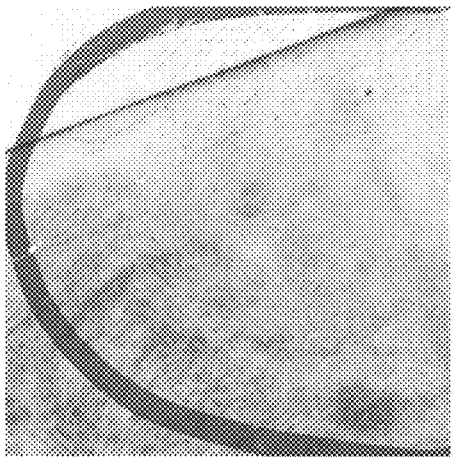

FIG. 8H depicts the ridge flow map extracted according to existing methods and superimposed on the latent image of FIG. 8A. As can be appreciated, the output according to existing methods fails to extract ridge flow for a large portion of the image. FIG. 8I depicts the ridge flow map of the mated ten-print image of FIG. 8B. FIG. 8J depicts the ridge flow map determined according to the implementations described in this disclosure. A significant improvement and completed mapping area may be observed relative to the ridge flow map of FIG. 8H. FIG. 8K shows an enhanced image using the short time Fourier Transform with the estimated ridge flow map. As shown in FIGS. 8J and 8K, the core/delta area of the fingerprint was successfully recovered.

Figure 6:
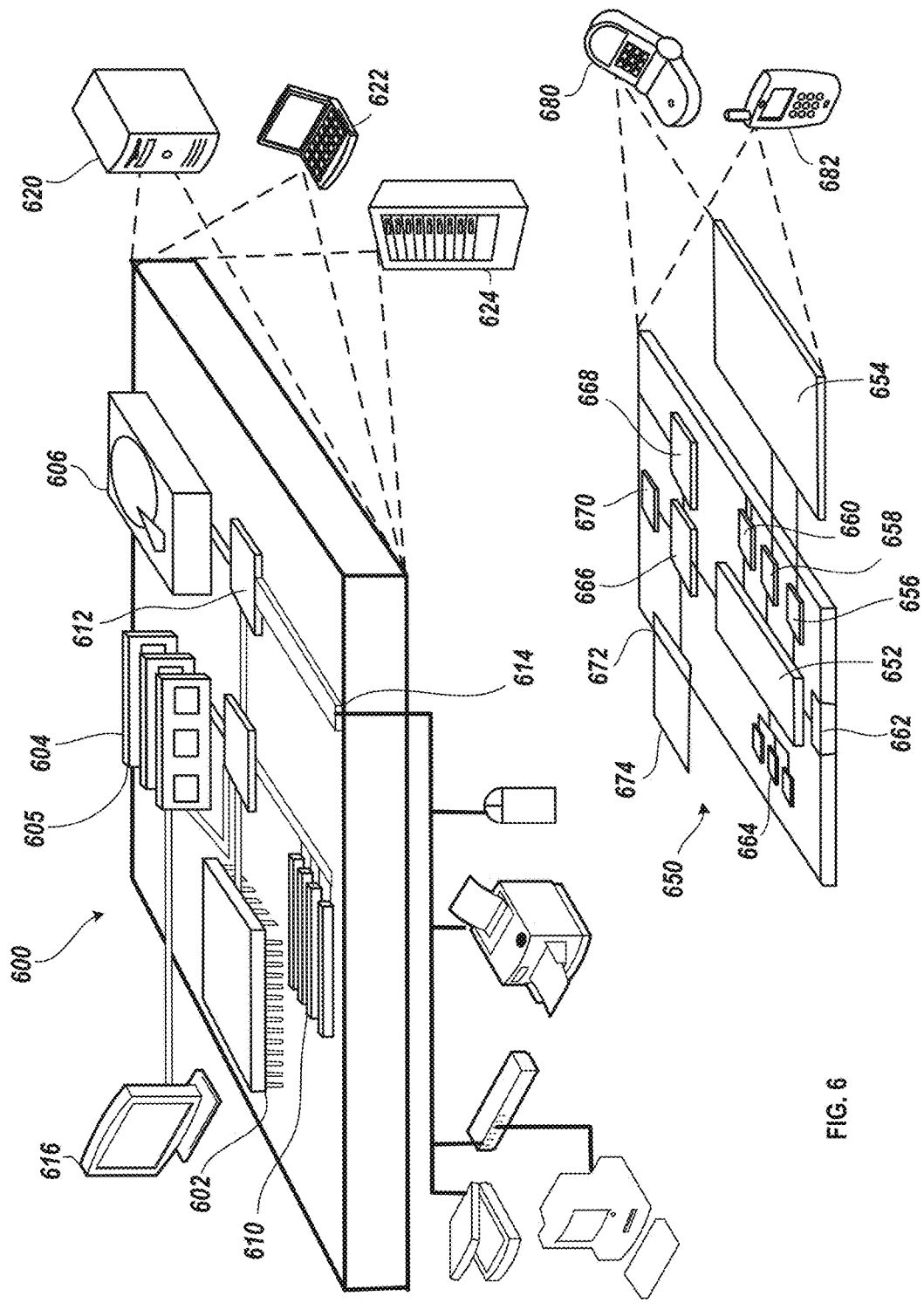
FIG. 6 is a block diagram of computing devices on which the processes described herein, or portions thereof, may be implemented.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices.

Additionally, computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations, e.g., as a server bank, a group of blade servers, or a multi-processor system.

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth intensive operations. Such allocation of functions is exemplary only. In one implementation, the high-speed controller 608 is coupled to memory 604, display 616, e.g., through a graphics processor or accelerator, and to high-speed expansion ports 610, which may accept various expansion cards (not shown). In the implementation, low-speed controller 612 is coupled to storage device 606 and low-speed expansion port 614. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, and an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 610 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound, e.g., voice messages, music files, etc. and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

While this specification contains many specifics, these should not be construed as limitations on the scope of the disclosure or of what may be claimed, but rather as descriptions of features specific to particular implementations. Certain features may be implemented as separate embodiments or in combination in a single embodiment. Although features may be described above as acting in certain combinations and may even be claimed as such, one or more features from a claimed combination may in some cases be excised from the combination, and the claimed combination may be directed to a subcombination or variation of a subcombination.

Similarly, while actions are described in a particular order in this specification, the description should not be understood as requiring that such actions be performed in the particular order shown or in sequential order, or that all illustrated actions be performed, to achieve desirable results. Moreover, the separation of various system components in the implementations described above should not be understood as requiring such separation in all implementations.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A method for estimating patterns of a latent fingerprint, the method comprising:
   obtaining (i) a latent fingerprint image, and (ii) a plurality of reference ridge flow maps that are each associated with a particular fingerprint pattern;
   determining, by one or more processors, a latent ridge flow map for the obtained latent fingerprint image;
   determining, by the one or more processors, a similarity score between the latent ridge flow map and each of the plurality of reference ridge flow maps by comparing one or more characteristics associated with the latent ridge flow map to one or more corresponding characteristics associated with each of the plurality of reference ridge flow maps;
   determining, by the one or more processors, a likely latent fingerprint pattern of the latent fingerprint image based on the determined similarity scores;
   selecting, by the one or more processors, a set of the reference ridge flow maps that have a pattern that matches the likely latent finger print pattern and that satisfy a similarity threshold;
   aggregating, by the one or more processors, the set of reference ridge flow maps that have a pattern that matches the likely latent finger print pattern and that satisfy the similarity threshold;
   transposing, by the one or more processors, an estimated latent ridge flow map onto the obtained latent fingerprint image, the estimated latent ridge flow map being based on the aggregated set of the reference ridge flow maps; and
   providing, for output, the obtained latent fingerprint image and the estimated latent ridge flow map transposed on to the obtained latent fingerprint image.

2. The method of claim 1, wherein the selected set of the reference ridge flow maps include reference ridge flow maps that have similarity scores greater or equal than the similarity threshold.

3. The method of claim 1, wherein determining the likely latent fingerprint pattern comprises:
   generating a feature vector that includes features associated with the plurality of reference ridge flow maps;
   inputting the generated feature vector into a trained classifier; and
   estimating one or more one or more fingerprint patterns present within the latent fingerprint image based at least on features associated with the plurality of reference ridge flow maps that are identified by the trained classifier.

4. The method of claim 3, wherein generating the feature vector comprises:
aligning the latent ridge flow map with each of the plurality of reference ridge flow maps;
comparing each block of the latent ridge flow map and each of the plurality of reference ridge flow maps;
determining the similarity scores associated with the comparing of each block of the latent ridge flow map to the plurality of reference maps; and
generating the feature vector based on the similarity scores.

5. The method of claim 4, wherein aligning the latent ridge flow map with each of the plurality of reference ridge flow maps comprises using one or more of:
a maximization of mutual information technique;
a generalized Hough transformation technique;
use of core, delta or distinctive pattern-based technique; and
a gradient decent method with a cost function technique.

6. The method of claim 1, wherein obtaining the plurality of reference ridge flow maps comprises:
obtaining a plurality of reference fingerprint images that are each associated with a respective fingerprint pattern, wherein one or more of the plurality of reference fingerprint images are associated with a fingerprint pattern different from a fingerprint pattern of another one of the plurality of reference fingerprint images;
computing a reference ridge flow map for each of the plurality of reference fingerprint images;
selecting a second set of representative reference ridge flow maps for each respective fingerprint pattern; and
storing, as the plurality of reference ridge flow maps, (i) the second set of representative ridge flow maps for each respective fingerprint pattern, and (ii) fingerprint patterns respectively corresponding to each representative ridge flow map among the second set of representative ridge flow maps.

7. The method of claim 6, wherein:
the obtained plurality of reference fingerprint images have a quality indicator that satisfies a quality threshold;
each of the plurality of reference fingerprint images includes (i) a ridge contrast satisfying a contrast threshold, (ii) a full fingerprint, and (iii) a plurality of fingerprint patterns; and
each of the plurality of reference fingerprint images is manually labelled to include one or more fingerprint patterns.

8. The method of claim 6, wherein selecting the second set of representative reference ridge flow maps for each respective fingerprint pattern comprises selecting the second set of representative reference ridge flow maps using one or more: (i) a K-means clustering technique, (ii) an agglomerative clustering technique, or (iii) an unsupervised learning technique.

9. The method of claim 1, wherein transposing the estimated latent ridge flow map onto the obtained latent fingerprint image comprises superimposing an aggregate ridge flow map that is generated by aggregating the set of the reference ridge flow maps and using transformation parameters obtained when comparing the one or more characteristics associated with the latent ridge flow map to the one or more corresponding characteristics associated with each of the plurality of reference ridge flow maps.

10. The method of claim 1, further comprising:
generating the estimated latent ridge flow map by:
for each block of the likely latent fingerprint pattern:
determining an estimate of a latent ridge flow block based on an aggregation of corresponding matched blocks of the selected set of reference ridge flow maps.

11. The method of claim 10, wherein the estimated latent ridge flow map is determined according to a weighted average of the corresponding matched blocks of the selected set of reference ridge flow maps.

12. The method of claim 10, wherein transposing the estimated latent ridge flow map onto the obtained latent fingerprint image comprises, for each block of the estimated latent ridge flow map:
determining a direction associated with the largest ridge flow in the estimated latent ridge flow block; and
assigning a direction to the estimated latent ridge flow block based in part on the determined direction associated with the largest ridge flow.

13. A system comprising:
a fingerprint scanning device, including (i) an interface to a fingerprint scanner, and (ii) a sensor associated with the fingerprint scanner, configured to identify a match between a search record representing a fingerprint of a subject and a reference record from among a plurality of reference records representing fingerprints of a plurality of historical subjects;
a database containing the plurality of reference records representing fingerprints of the plurality of historical subjects; and
one or more computing devices in communication with the database and the fingerprint scanning device, the one or more computing devices having a processor and a memory coupled to the processor, the one or more computing devices configured perform operations comprising:
obtaining (i) a latent fingerprint image, and (ii) a plurality of reference ridge flow maps that are each associated with a particular fingerprint pattern;
determining a latent ridge flow map for the obtained latent fingerprint image;
determining a similarity score between the latent ridge flow map and each of the plurality of reference ridge flow maps by comparing one or more characteristics associated with the latent ridge flow map to one or more corresponding characteristics associated with each of the plurality of reference ridge flow maps;
determining a likely latent fingerprint pattern of the latent fingerprint image based on the determined similarity scores;
selecting a set of the reference ridge flow maps that have a pattern that matches the likely latent fingerprint pattern and that satisfy a similarity threshold;
aggregating the set of reference ridge flow maps that have a pattern that matches the likely latent fingerprint pattern and that satisfy the similarity threshold;
transposing an estimated latent ridge flow map onto the obtained latent fingerprint image, the estimated latent ridge flow map being based on the aggregated set of the reference ridge flow maps; and
providing, for output, the obtained latent fingerprint image and the estimated latent ridge flow map transposed on to the obtained latent fingerprint image.

14. The system of claim 13, wherein determining the likely latent fingerprint pattern comprises:
generating a feature vector that includes features associated with the plurality of reference ridge flow maps;

inputting the generated feature vector into a trained classifier; and estimating one or more one or more fingerprint patterns present within the latent fingerprint image based at least on features associated with the plurality of reference ridge flow maps that are identified by the trained classifier.

15. The system of claim 13, wherein transposing the estimated latent ridge flow map onto the obtained latent fingerprint image comprises superimposing an aggregate ridge flow map that is generated by aggregating the set of the reference ridge flow maps and using transformation parameters obtained when comparing the one or more characteristics associated with the latent ridge flow map to the one or more corresponding characteristics associated with each of the plurality of reference ridge flow maps.

16. The system of claim 13, wherein the operations further comprise:
generating the estimated latent ridge flow map by:
for each block of the likely latent fingerprint pattern:
determining an estimate of a latent ridge flow block based on an aggregation of corresponding matched blocks of the selected set of reference ridge flow maps.

17. One or more non-transitory computer-readable storage media comprising instructions, which, when executed by one or more computing devices, cause the one or more computing devices to perform operations comprising:
obtaining (i) a latent fingerprint image, and (ii) a plurality of reference ridge flow maps that are each associated with a particular fingerprint pattern;
determining a latent ridge flow map for the obtained latent fingerprint image;
determining a similarity score between the latent ridge flow map and each of the plurality of reference ridge flow maps by comparing one or more characteristics associated with the latent ridge flow map to one or more corresponding characteristics associated with each of the plurality of reference ridge flow maps;
determining a likely latent fingerprint pattern of the latent fingerprint image based on the determined similarity scores;
selecting a set of the reference ridge flow maps that have a pattern that matches the likely latent finger print pattern and that satisfy a similarity threshold;
aggregating the set of reference ridge flow maps that have a pattern that matches the likely latent finger print pattern and that satisfy the similarity threshold;
transposing an estimated latent ridge flow map onto the obtained latent fingerprint image, the estimated latent ridge flow map being based on the aggregated set of the reference ridge flow maps; and
providing, for output, the obtained latent fingerprint image and the estimated latent ridge flow map transposed on to the obtained latent fingerprint image.

18. The one or more non-transitory computer-readable storage media of claim 17, wherein determining the likely latent fingerprint pattern comprises:
generating a feature vector that includes features associated with the plurality of reference ridge flow maps;
inputting the generated feature vector into a trained classifier; and
estimating one or more one or more fingerprint patterns present within the latent fingerprint image based at least on features associated with the plurality of reference ridge flow maps that are identified by the trained classifier.

19. The one or more non-transitory computer-readable storage media of claim 17, wherein transposing the estimated latent ridge flow map onto the obtained latent fingerprint image comprises superimposing an aggregate ridge flow map that is generated by aggregating the set of the reference ridge flow maps and using transformation parameters obtained when comparing the one or more characteristics associated with the latent ridge flow map to the one or more corresponding characteristics associated with each of the plurality of reference ridge flow maps.

20. The one or more non-transitory computer-readable storage media of claim 17, wherein the operations further comprise:
generating the estimated latent ridge flow map by:
for each block of the likely latent fingerprint pattern:
determining an estimate of a latent ridge flow block based on an aggregation of corresponding matched blocks of the selected set of reference ridge flow maps.

* * * * *